US008904706B1

(12) United States Patent  
Smith

(10) Patent No.: US 8,904,706 B1  
(45) Date of Patent: Dec. 9, 2014

(54) MODULAR INTERLOCKING PLANTER

(76) Inventor: Barry C. Smith, Honeywood (CA)

( * ) Notice: Subject to any disclaimer, the term of this patent is extended or adjusted under 35 U.S.C. 154(b) by 483 days.

(21) Appl. No.: 13/285,237

(22) Filed: Oct. 31, 2011

(51) Int. Cl.
*A01G 9/02* (2006.01)

(52) U.S. Cl.
USPC .......................................................... 47/65.6

(58) Field of Classification Search
CPC ........... A01G 9/00; A01G 9/02; A01G 9/026; A01G 9/027; A01G 9/028; A01G 9/20; A01G 9/1423; A01G 9/16; A01G 9/24; A01G 9/14; A01G 1/08; A01G 13/04
USPC .......... 47/65.6, 65.5, 19.1, 19.2, 65, 66.1, 85, 47/86, 66.3, 17, 41.14, 46, 33, 29.5, 29.6; 403/360, 381, 254, 253; 220/4.01, 600, 220/660; 405/284, 285
See application file for complete search history.

(56) References Cited

U.S. PATENT DOCUMENTS

| 1,124,640 | A | * | 1/1915 | Ney et al. ............................. 47/3 |
| 1,345,156 | A | * | 6/1920 | Flynn ............................. 52/258 |
| 1,993,692 | A | * | 3/1935 | Suter ............................. 206/423 |
| 2,388,297 | A | * | 11/1945 | Slaughter ........................ 428/53 |
| 2,511,162 | A | * | 6/1950 | Jackson ........................ 47/41.13 |
| 2,573,084 | A | * | 10/1951 | Writesel ............................. 47/18 |
| 4,026,084 | A | * | 5/1977 | Goose ............................. 52/780 |
| 4,120,119 | A | | 10/1978 | Engel |
| 4,161,085 | A | * | 7/1979 | Moffett, Jr. ........................ 47/82 |
| 4,334,868 | A | * | 6/1982 | Levinrad ........................ 434/172 |
| 4,429,489 | A | * | 2/1984 | Fischer ............................. 47/18 |
| 4,866,891 | A | * | 9/1989 | Young ............................. 52/105 |
| 4,920,695 | A | | 5/1990 | Garden |
| 5,168,678 | A | * | 12/1992 | Scott et al. ........................ 52/102 |
| 5,215,205 | A | * | 6/1993 | Behlman ........................ 220/4.31 |
| 5,400,544 | A | * | 3/1995 | Wien ................................. 47/33 |
| 5,852,895 | A | | 12/1998 | Sinanan |
| 6,435,471 | B1 | * | 8/2002 | Piccone ............................ 249/47 |
| 6,935,081 | B2 | * | 8/2005 | Dunn et al. ........................ 52/426 |
| 7,478,501 | B2 | * | 1/2009 | Wilbanks et al. ................. 47/45 |
| 7,748,162 | B1 | * | 7/2010 | Necessary et al. ................ 47/17 |
| 8,424,258 | B2 | * | 4/2013 | Modica et al. ................ 52/285.4 |
| 2002/0007589 | A1 | * | 1/2002 | Marchioro ...................... 47/65.5 |
| 2004/0198141 | A1 | * | 10/2004 | Buhrman et al. ............... 446/85 |
| 2005/0016103 | A1 | * | 1/2005 | Piccone ........................ 52/481.1 |
| 2005/0155287 | A1 | | 7/2005 | Phillips |
| 2006/0043256 | A1 | * | 3/2006 | Bogrett ............................. 249/2 |

(Continued)

FOREIGN PATENT DOCUMENTS

| DE | 10261243 | A1 | * | 7/2003 | ............... A01G 9/20 |
| DE | 102008056299 | A1 | * | 5/2010 | ............... E04H 17/16 |

(Continued)

*Primary Examiner* — Monica Williams  
*Assistant Examiner* — Joshua Huson  
(74) *Attorney, Agent, or Firm* — Robert C. Montgomery; Montgomery Patent & Design

(57) ABSTRACT

A modular interlocking planter apparatus provides modular assembly of a planter structure having a plurality of wall panels, a plurality of connectors, a plurality of internally spanning support bar assemblies, and a drain. The wall panels are planar waterproof members arranged vertically and connected by the connectors to secure adjacent wall panels together to form various shaped enclosures for above ground planting and growing. Each opposing pair of connectors includes a pair of horizontal spanning support bar assemblies to provide structural stability. One (1) of the wall panels includes the drain vent connected to a length of perforated drain tile which extends throughout the assembled planter to receive and drain water from soil placed in the planter.

9 Claims, 6 Drawing Sheets

(56) References Cited

U.S. PATENT DOCUMENTS

| | | | |
|---|---|---|---|
| 2007/0028512 A1* | 2/2007 | McGhee | 47/17 |
| 2007/0196184 A1* | 8/2007 | Hammer et al. | 405/284 |
| 2008/0120905 A1* | 5/2008 | Pai | 47/66.1 |
| 2009/0041552 A1* | 2/2009 | Hammer | 405/284 |
| 2010/0236142 A1* | 9/2010 | Drewry | 47/29.1 |
| 2010/0242357 A1* | 9/2010 | Vogler et al. | 47/33 |
| 2011/0252702 A1* | 10/2011 | Gazjuk | 47/33 |
| 2012/0073229 A1* | 3/2012 | Castonguay et al. | 52/426 |
| 2012/0096766 A1* | 4/2012 | Bosch et al. | 47/33 |

FOREIGN PATENT DOCUMENTS

| | | | | |
|---|---|---|---|---|
| FR | 2684838 A1 | * | 6/1993 | A01G 1/08 |
| FR | 2846191 A1 | * | 4/2004 | A01G 9/02 |
| GB | 2402595 A | * | 12/2004 | A01G 9/02 |

* cited by examiner

MODULAR INTERLOCKING PLANTER

RELATED APPLICATIONS

Not Applicable

FIELD OF THE INVENTION

The present invention relates generally to planters, and in particular, to a modular interlocking planter assembly for above ground use.

BACKGROUND OF THE INVENTION

Plants and flowers are a welcome addition to any decor. Their vibrant colors combined with their unique physical traits often form the centerpiece of a home or garden. As with most living things, these plants and flowers require attentive care for them to achieve their full potential. This, of course, includes many tasks such as pruning, feeding and watering. As one might expect, these tasks require one to go to the location and elevation of the plant. Those at ground level or even in flower boxes are often inaccessible especially for those who are elderly, disabled, or confined to a wheelchair. The only way such individuals can enjoy gardening is that of individual plants in individual pots placed on a table or other waist high support. Such restrictions greatly limit the enjoyment of gardening.

While various planters exist in the form of large growing pots or boxes, none of these planters overcome the need to bend or kneel to get close enough to tend to the plants. Elevated planters have attempted to address this problem; however these types of planters require the installation of bracketry and are limited in size and weight of the planter in order to be used in a safe manner.

SUMMARY OF THE INVENTION

The inventor has therefore recognized the aforementioned inherent problems and lack in the art and observed that there is a need for a modular planter that can be used by those who are disabled, elderly, or confined to a wheelchair such that they can enjoy gardening without restrictions or limitations. In accordance with the invention, it is an object of the present embodiments to solve at least one (1) of these problems.

The inventor recognized these problems and has addressed this need by developing an interlocking planter that allows for the easy tending of various flowers, vegetables, and plants by anyone and especially those who may be disabled, elderly, or confined to a wheelchair. The inventor has thus realized the advantages and benefits of providing a modular interlocking planter having a plurality of individual wall panels each with a front face, a rear face, a pair vertical sides, and a pair of horizontal sides. The pair of vertical sides each has a joint feature extending an entire height. A plurality of individual outer corner connectors is provided, each having a pair of outer corner connector slots along an entire height of two adjacent side surfaces attachable to the joint feature. A plurality of individual straight connectors is provided, each having a pair of straight connector slots along an entire height of two (2) opposing side surfaces attachable to the joint feature. A plurality of inner corner connectors is provided, each having a pair of inner corner connector slots along an entire height of two (2) adjacent side surfaces attachable to the joint features. The plurality of wall panels is selectively interconnected together on a ground surface to form an adjustable enclosure having a hollow interior and an open top. The enclosure adapted to receive and retain an amount of soil fill for cultivating vegetation. Each of the straight connectors connects second pairs of wall panels in a planar orientation. Each of the outer corner connectors connects first pairs of wall panels in a first perpendicular orientation forming exterior corners. Each of the inner corner connectors connects third pairs of wall panels in a second perpendicular orientation forming interior corners. A plurality of upper support bar assemblies is provided and attachable between opposing pairs of straight connectors or between opposing inner corner connectors and straight connectors for structural support. A plurality of lower support bar assemblies is provided and attachable between opposing pairs of straight connectors or between opposing inner corner connectors and straight connectors for structural support.

In certain embodiments of the invention, at least one of the plurality of wall panels is a front wall panel having a drain vent disposed through a lower end. One (1) end of a length of drain tile disposed within the enclosure hollow interior is connected in fluid communication with the drain vent.

In certain embodiments of the invention, each of the plurality of wall panels has a wall recess portion disposed on a front face. The wall recess portion is adapted to be covered by an attachable façade.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

DESCRIPTIVE KEY

Figure 1:
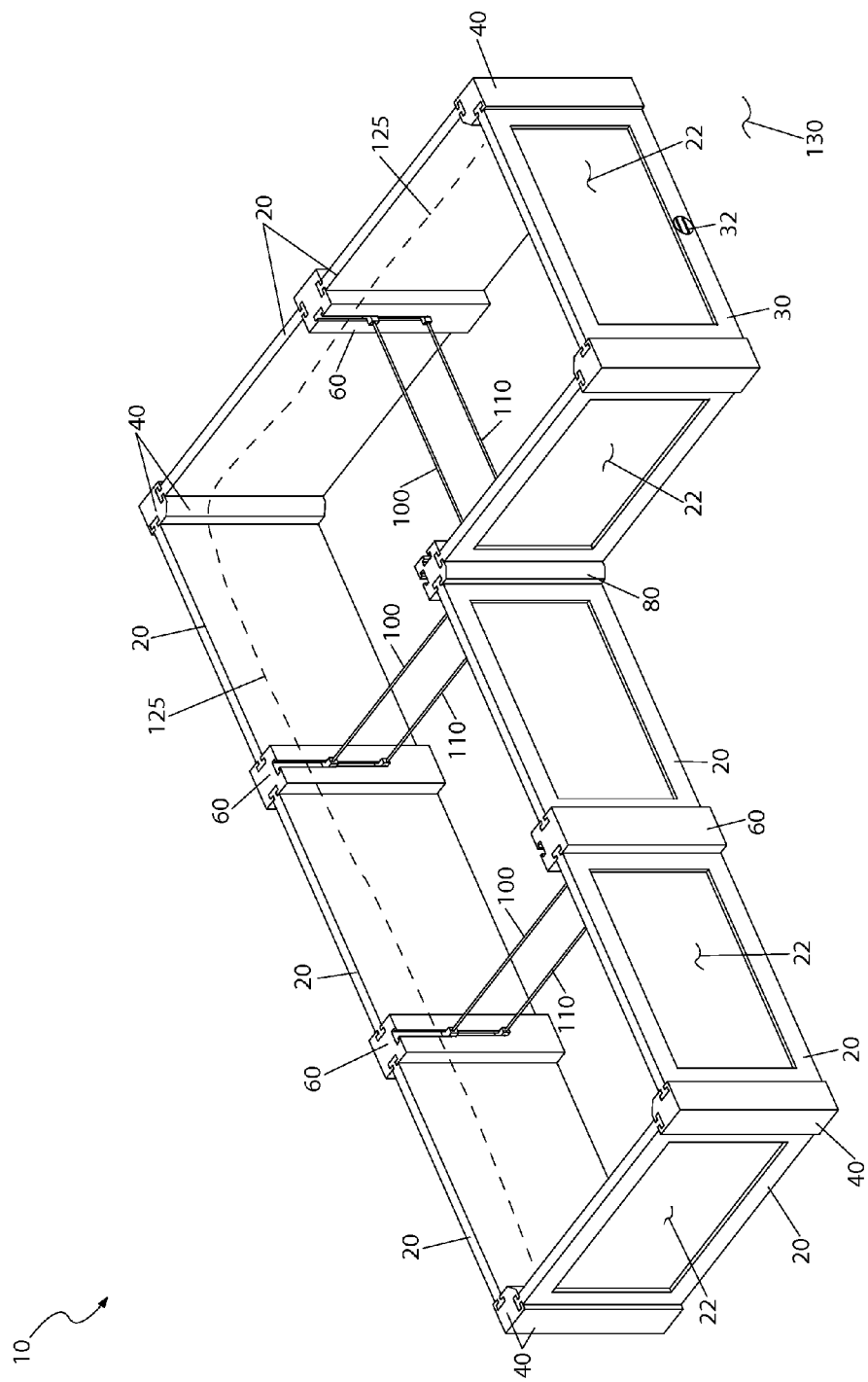
FIG. 1 is a perspective view of an modular interlocking planter in accordance with the invention.

10 modular interlocking planter
20 wall panel
22 wall recess portion
24 drain vent
26 joint feature
30 front wall panel 32 drain vent
40 outer corner connector
42 beveled edge
44a first outer corner connector slot
44b second outer corner connector slot
60 straight connector
62a first straight connector slot
62b second straight connector slot
64 first upper support bar slot
66 first lower support bar slot
80 inner corner connector
84a first inner corner connector slot
84b second inner corner connector slot
86 second upper support bar slot
88 second lower support bar slot
100 upper support bar assembly
102a first upper joining feature
102b second upper joining feature
104a first support bar
104b second support bar
110 lower support bar assembly
116a first lower joining feature
116b second lower joining feature
120 drain tile
125 soil fill
130 ground surface

DETAILED DESCRIPTION OF THE PREFERRED EMBODIMENT

In accordance with the invention, the best mode is presented in terms of a preferred embodiment, herein depicted within FIGS. 1 through 6. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Referring now to FIGS. 1 through 6, depicting a modular interlocking planter (herein described as an "apparatus") 10, where like reference numerals represent similar or like parts. In accordance with the invention, the present disclosure describes certain embodiments of the apparatus 10 which provides an elevated, above-ground gardening structure for growing flowers, herbs, or vegetables. The apparatus 10 generally includes a plurality of plastic wall panels 20 and at least one (1) interconnected front panel 30 to form various overall shapes such as, but not limited to: a square shape, a rectangular shape, an "L"-shape, a "T"-shape, and the like. The wall panels 20 are joined by a combination of interconnecting outer corner connectors 40, straight connectors 60, and inner corner connectors 80. Once assembled upon a ground surface 130, the apparatus 10 is filled with a selected soil fill 125 such as, but not limited to, a base layer of loose gravel and a top layer of topsoil to produce an elevated gardening surface.

Figure 2:
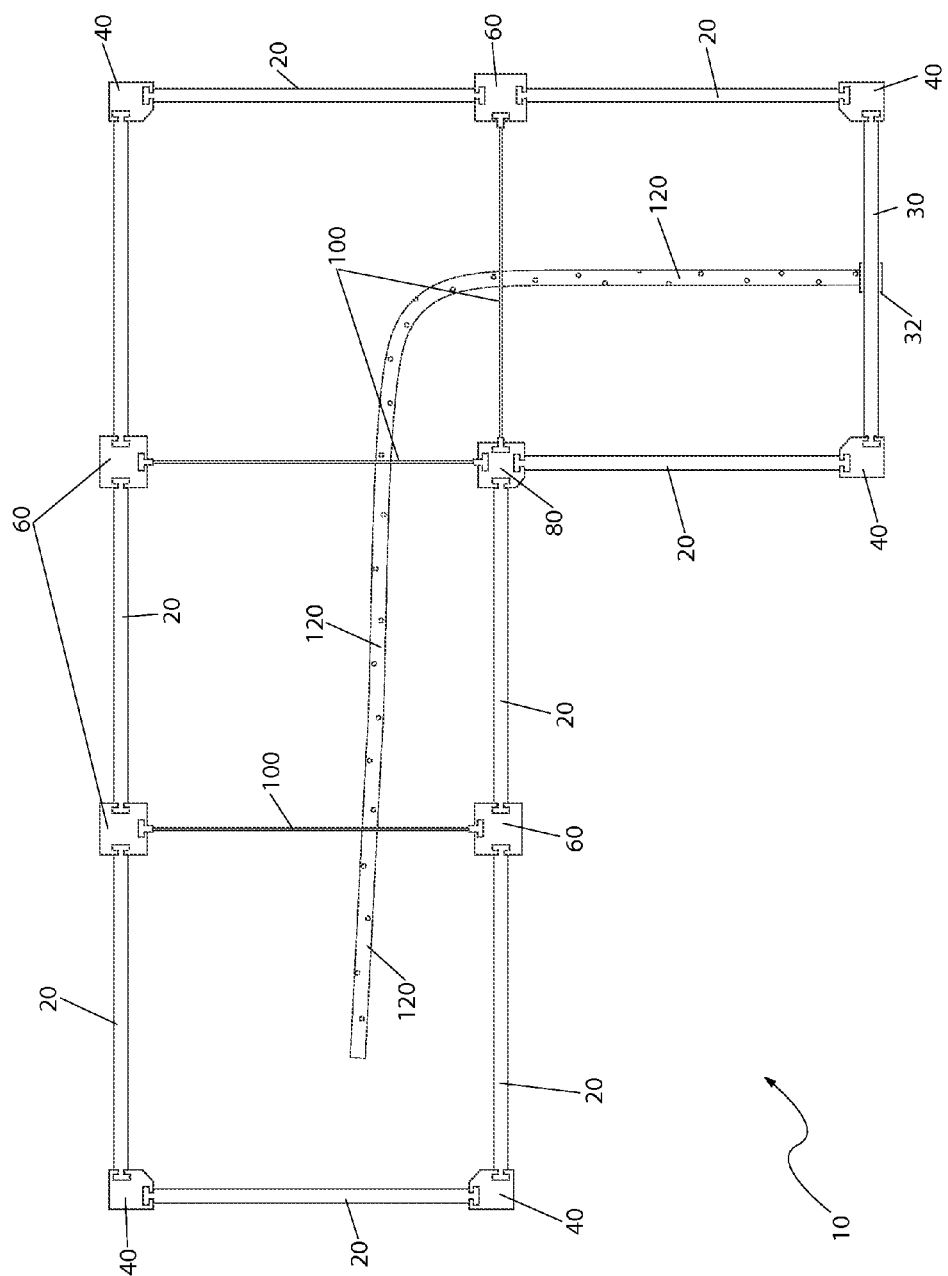
FIG. 2 is a top view of the modular interlocking planter.

FIGS. 1 and 2 show perspective and top views of the apparatus 10. The apparatus 10 is depicted as being constructed having a generally "L"-shape for illustration purposes; however, it can be appreciated that the modular construction of the apparatus 10 allows assembly and arrangement of members to create various perimeter shapes. The apparatus 10, as shown, includes a plurality of wall panels 20, at least one (1) front wall panel 30, a plurality of outer corner connectors 40, a plurality of straight connectors 60, an inner corner connector 80, and a length of drain tile 120.

The wall panels 20, 30 are molded plastic structures approximately four (4) feet in width and three (3) feet in height and approximately one (1) inch thick having a decorative outwardly-facing concentric wall recess portion 22. The wall recess portion 22 provides a surface for exterior decoration by an end user and can either be left uncovered or decorated using various covering materials such as, but not limited to: painting, ceramic or plastic tiles, a bonded vinyl sheet, flagstone covering, and the like, intended to match a particular landscaping décor. The wall panels 20, 30 are securely attached to each other to form a rigid structure by the interconnecting outer corner connectors 40, the straight connectors 60, and the inner corner connectors 80.

The connectors 40, 60, 80 are extruded plastic vertical members having a similar height as the wall panels 20, 30 and are approximately six (6) inches wide. The connectors 40, 60, 80 further include "T"-shaped slots formed within two (2) side surfaces to provide for the joining of a pair of wall panels 20, 30 (see FIGS. 3, 5, and 6). The straight connectors 60 provide for attachment of multiple panels 20, 30 that are arranged in a coplanar manner. Each straight connector 60 is affixed to an adjacent straight connector 60, an adjacent outer corner connector 40, or adjacent inner corner connectors 80 using one (1) upper support bar assembly 100 and one (1) lower support bar assembly 110. The connectors 40, 60, 80 and the support bar assemblies 100, 110 reinforce adjacent wall panels 20 to prevent distortion or warping of the wall panels 20 from forces applied by contained soil fill 125 (see FIGS. 4a, 4b, 5, and 6).

The front wall panel 30 includes similar functions and structure as the wall panel 20; however, the front wall panel 30 includes a drain vent 32 that provides for drainage of excess water collected within the apparatus 10. The drain vent 32 includes a horizontal fluid conduit which extends through the front wall panel 30 approximately one (1) foot above the ground surface 130. The drain vent 32 is suitably sized to be snuggly inserted into a length of corrugated and perforated drain tile 120 which is routed within the apparatus 10. The drain tile 120 extends from the drain vent 32 to an opposite end of the apparatus 10 prior to backfill with soil fill 125. The drain vent 32 is molded into the front wall panel 30 and maintains a water level within the soil fill 125. The drain vent 32 also includes an attractive screen or mesh outer surface allowing free drainage of the excess water from the perforated drain tile 120.

Figure 3:
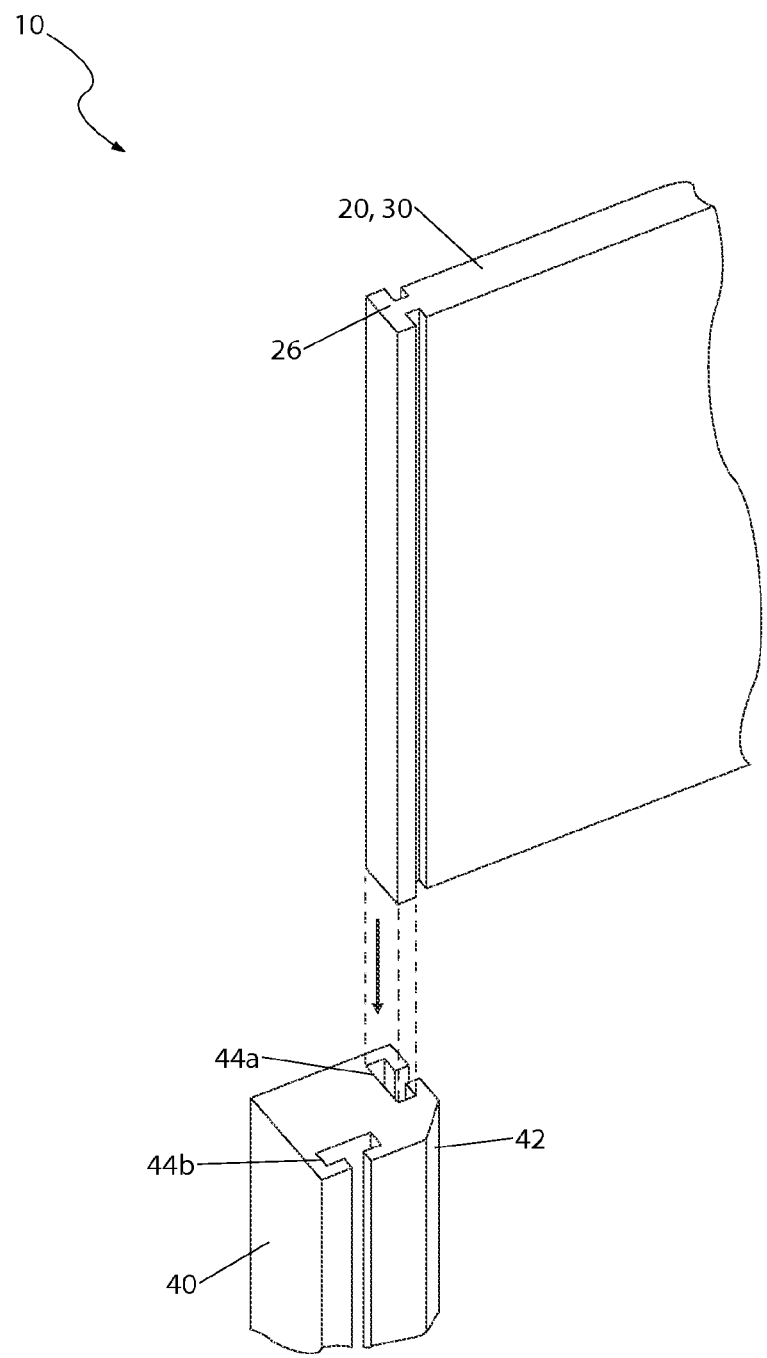
FIG. 3 is a partial perspective view of a wall panel and a corner connector of the modular interlocking planter.

FIG. 3 shows an exploded perspective view of a partial wall panel 20, 30 and a partial corner connector 40 depicted in a pre-assembled state. The wall panels 20, 30 include a "T"-shaped joint feature 26 protruding outwardly along each opposing vertical side to provide secure attachment of the wall panels 20, 30 to corresponding first outer connector slot 44a and second outer connector slot 44b of the outer corner connector 40. The joint features 26 are sized to be slidingly inserted into the first outer connector slot 44a and second outer connector slot 44b of the outer corner connectors 40.

The outer corner connector 40 is a vertical member having a generally square cross section that can be produced in an extrusion process. The outer corner connector 40 also has an inwardly facing decorative beveled edge 42. The first outer corner connector slot 44a and the second outer corner connector slot 44b extend an entire height of the outer corner connector 40. The outer corner connector slots 44a, 44b are located along adjacent sides of the outer corner connector 40 and upon insertion of respective wall panels 20, 30 forms a ninety (90) degree angle along the perimeter of the apparatus 10.

Figure 4A:
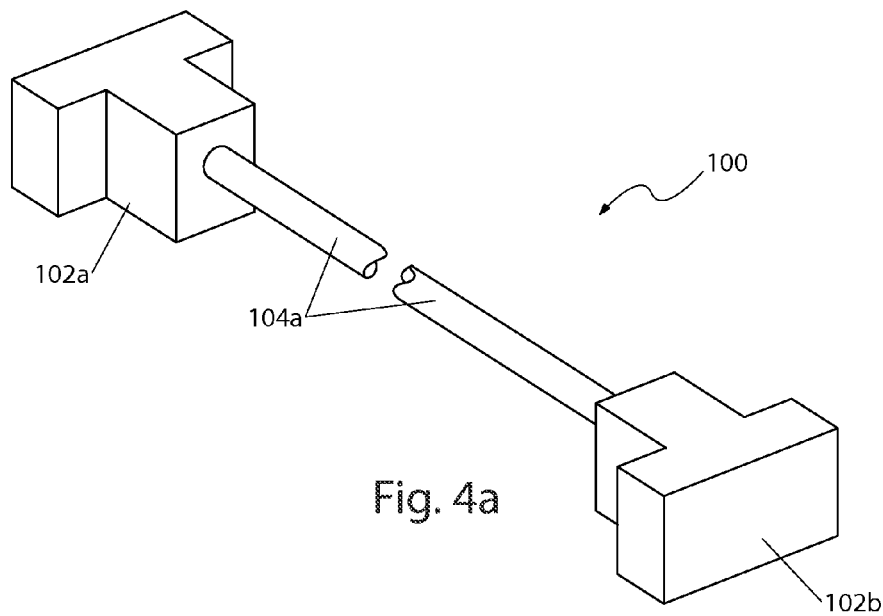
FIG. 4*a* is a perspective view of an upper support bar assembly of the modular interlocking planter.
Figure 4B:
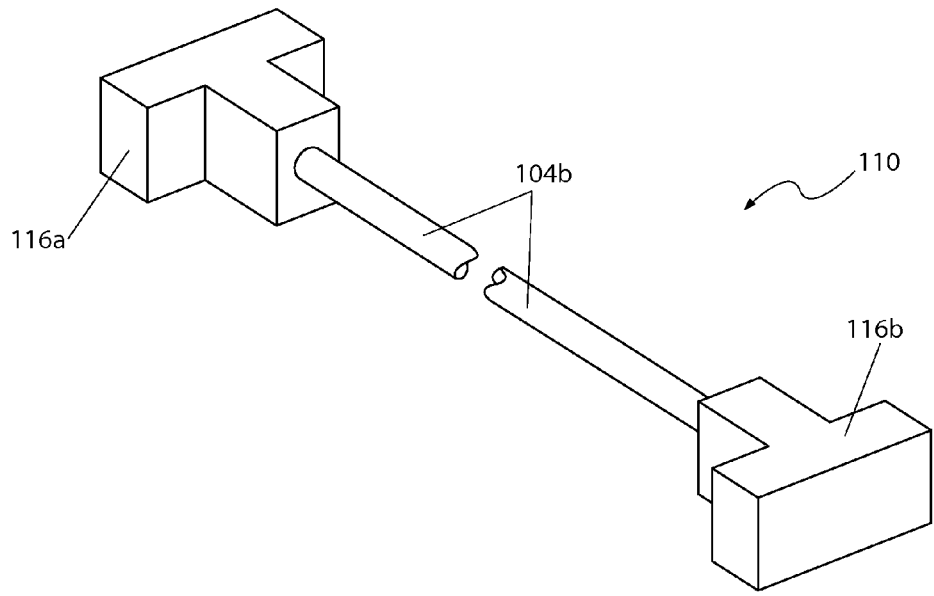
FIG. 4*b* is a perspective view of a lower support bar assembly of the modular interlocking planter.

FIGS. 4a and 4b show perspective views of an upper support bar assembly 100 and a lower support bar assembly 110. The apparatus 10 provides internal stiffening and reinforcement between opposing connectors 40, 60, 80 by the plurality of upper support bar assemblies 100 and lower support bar assemblies 110. The particular number of the upper support bar assemblies 100 and lower support bar assemblies 110 is based upon the particular configuration of the apparatus 10 and number of wall panels 20 and connectors 40, 60, 80.

Each upper support bar assembly 100 includes a first upper joining feature 102a, a second upper joining feature 102b, and a first support bar 104a connected between the joining features 102a, 102b. The first support bar 104a is a elongated rod extending between and being integral to the first upper joining feature 102a and second upper joining feature 102b. Similarly, each lower support bar assembly 110 includes a first lower joining feature 106a, a second lower joining feature 106b, and a second support bar 104b extending connected between the joining features 116a, 116b. The second support bar 104b is a elongated rod extending between and being integral to the first lower joining feature 116a and second lower joining feature 116b.

The support bar assemblies 100, 110 each have an overall length equal to a distance between facing sides of opposing connectors 40, 60, 80. Each straight connector 40 and inner corner connector 80 includes a first upper support bar slot 64 and a first lower support bar slot 66. The support bar assemblies 100, 110 provide a rigid horizontal brace between the connectors 40, 80 when the upper joining features 102a, 102b and lower joining features 116a, 116b are insertingly coupled to respective upper support bar slots 64 and lower support bar slots 66. The lower joining features 106a, 106b have a slightly narrower shape than the upper joining features 102a, 102b. Similarly the lower support bar slot 66 has a narrower opening. This configuration allow sliding insertion of the lower joining features 116a, 116b into the upper support bar slot 64 continuing down into the lower support bar slots 66. The wider upper joining features 102a, 102b slidingly insert into the upper support bar slots 64 but are prevented from entering the lower support bar slots 66 due to their larger size.

Figure 5:
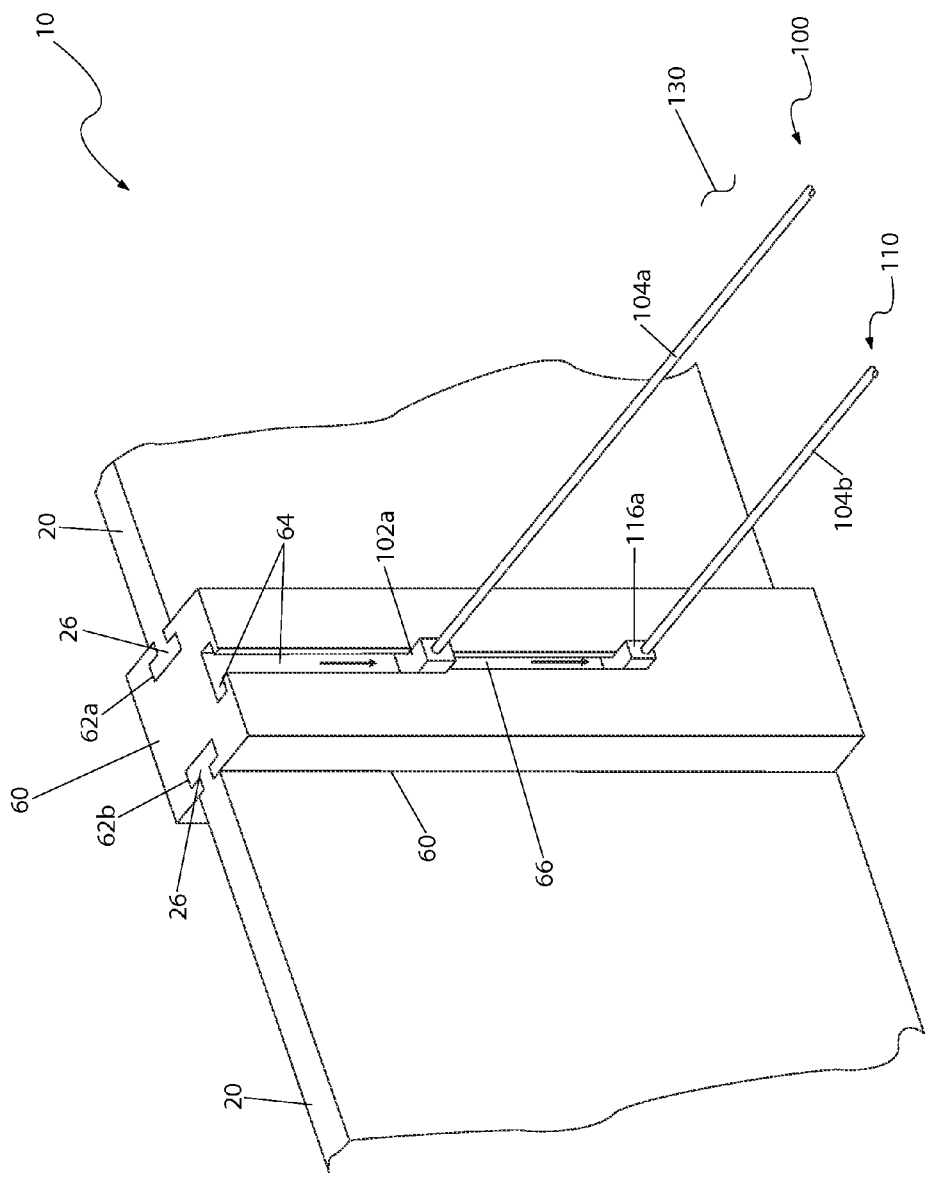
FIG. 5 is a partial perspective view the modular interlocking planter depicting assembly of an upper support bar assembly and a lower support bar assembly to a straight connector; and, FIG. 6 is a partial perspective view of the modular interlocking planter depicting assembly the upper support bar assembly and the lower support bar assembly to an inside corner connector.

FIG. 5 shows a partial perspective view of the straight connector 60 with the wall panels 20, the upper support bar assembly 100, and the lower support bar assembly 110 attached. Based upon a particular selected arrangement of the wall panels 20, 30 and connectors 40, 60, 80, the apparatus 10 can include two (2) or more straight connectors 60 to rigidly join pairs of coplanar and adjacent wall panels 20, 30. Each straight connector 60 includes a similar height as the wall panels 20, 30 and a first straight connector slot 62a, a second straight connector slot 62b, a first upper support bar slot 64, and a first lower support bar slot 66. The first straight connector slot 62a and second straight connector slot 62b extend vertically across the height of the straight connector 60 and are located along opposing side surfaces having a similar form and function as the connector slots 44a, 44b of the outer corner connector 40.

The first upper support bar slots 64 and first lower support bar slots 66 form upper and lower portions of a vertical "T"-shaped groove formed along an inward-facing side of the straight connector 60. The first upper support bar slot 64 and the first lower support bar slot 66 comprise respective wide and narrow portions of the groove, thereby allowing the lower support bar assembly 110 to slide further downward to a bottom end portion of the first lower support bar slot 66 and be securely positioned approximately one (1) foot above the ground surface. The upper support bar assembly 100 in turn rests upon a bottom portion of the first upper support bar slot 64 approximately two (2) feet above the ground surface 130.

Figure 6:
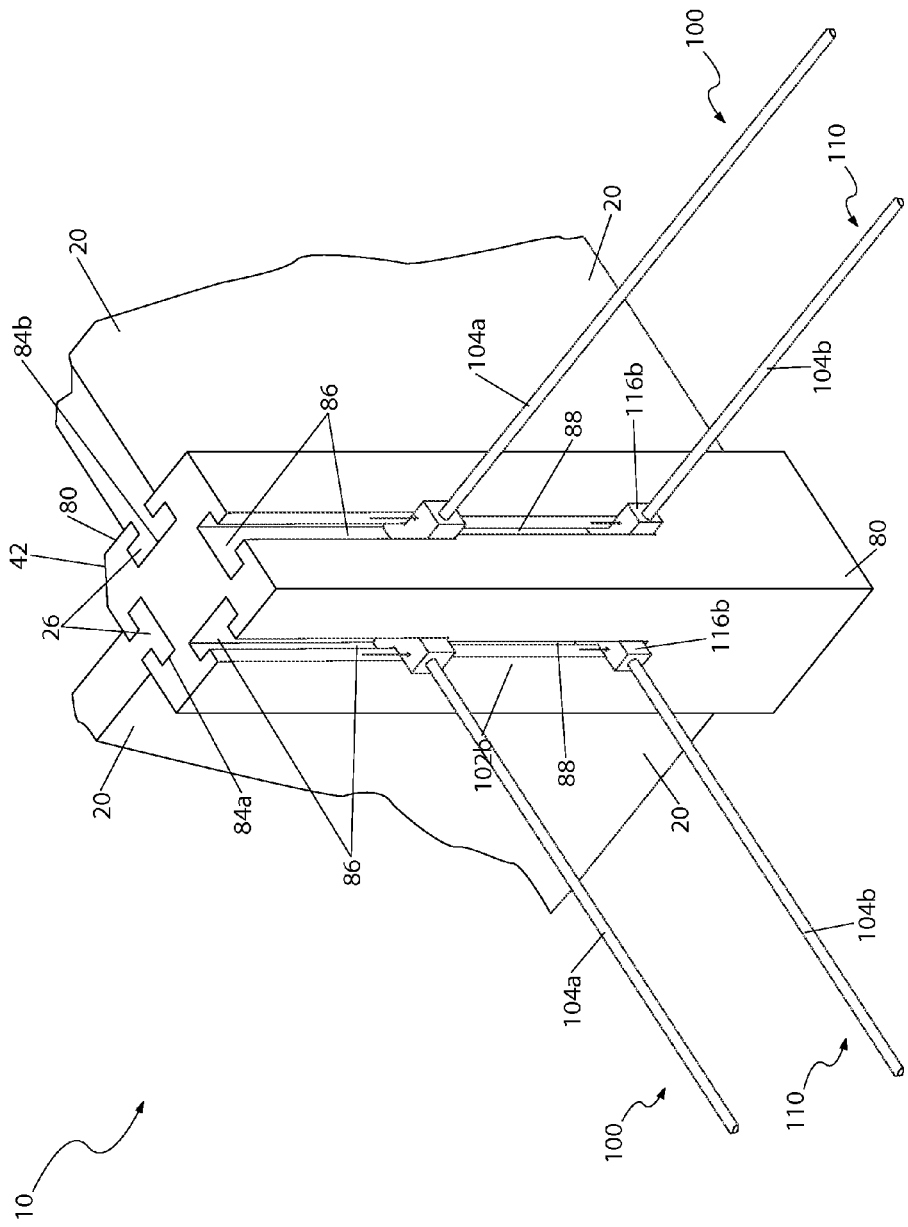

FIG. 6 shows a partial perspective view of the inside corner connector 80 with wall panels 20, the upper support bar assemblies 100, and lower support bar assemblies 110 attached. Based upon a particular selected arrangement of the wall panels 20, 30 and connectors 40, 60, 80, the apparatus 10 can include one (1) or more inside corner connectors 80 to rigidly join a pair of adjacent perpendicular wall panels 20, 30s to form an inside right angle. The inside corner connector 80 has a rectangular cross section and a height similar to that of the wall panels 20, 30. The inside corner connector 80 also includes a first inner corner connector slot 84a, a second inner corner connector slot 84b, a pair of second upper support bar slots 86, and a pair of second lower support bar slots 88. The first inner corner connector slot 84a and second inner corner connector slot 84b provide removable attachment of the wall panels 20, 30 to two (2) adjacent side surfaces of the inside corner connector 80. The inside corner connector 80 also includes a decorative beveled edge 42 located in between the first inner corner connector slot 84a and second inner corner connector slot 84b. The two (2) remaining adjacent side surfaces of the inside corner connector 80 include the second upper support bar slot 86 and second lower support bar slot 88 that provide sliding insertion of upper support bar assemblies 100 and lower support bar assemblies 110 to provide a reinforced, braced connection of opposing straight connectors 60 or, based upon a particular arrangement of the apparatus 10, to another inside corner connector 80.

It can be appreciated by one skilled in the art that other styles and configurations of the invention can be easily incorporated into the teachings of the present disclosure and only one particular configuration has be shown and described for purposes of clarity and disclosure and not by way of limitation of scope.

In accordance with the invention, the preferred embodiment can be utilized by the user in a simple and effortless manner with little or no training. After initial purchase or acquisition of the apparatus 10, it is installed and utilized as indicated in FIGS. 1 through 6.

The method of installing and utilizing the apparatus 10 can be achieved by performing a series of steps. It can be appreciated that the steps described can be performed in alternative order and as such should not be viewed as a limiting factor. Following acquisition of the apparatus 10, a user will select a combination of individual wall panels 20, 30 and connectors 40, 60, 80 to construct a selected pre-determined perimeter outline and custom shaped garden structure. The user can also select from various desired colors and patterns to match an existing décor. Choosing a level, or near level, ground surface 130 having sufficient area onto which the apparatus 10 can be assembled. Connecting an outer corner connector 40 and a wall panel 20 by inserting a joint feature 26 of the wall panel 20 into a first connector slot 44a or second connector slot 44b of the outer corner connector 40 until a top edge of the wall panel 20 is level with a top surface of the outer corner connector 40. Inserting a joint feature 26 of a front wall panel 30 into the remaining connector slots 44a, 44b of the outer corner connector 40. Inserting the remaining available joint features 26 of the attached wall panels 20, 30 into straight connector slots 62a, 62b of a straight connector 60, or into first outer corner connector slots 44a or second outer corner connector slots 44b of an outer corner connector 40, or into first inner corner connector slots 84*a* or second inner corner connector slots 84*b* of an inner corner connector 80. Continuing to join wall panels 20, 30 and connectors 40, 60, 80 until having created a closed perimeter shape of the apparatus 10. Installing lower support bar assemblies 110 and upper support bar assemblies 100 into opposingly positioned pairs of upper support bar slots 64 and pairs of first lower support bar slots 66 of straight connectors 60, or into opposingly positioned first upper support bar slots 64 and first lower support slots 66 of the straight connectors 60 with an opposing second upper support slots 86 and second lower support slots 88 of an inner corner member 80 by downwardly inserting lower joining features 116*a*, 116*b* of the lower support bar assemblies 110 into the lower support bar slots 66, 88 and downwardly inserting the upper joining features 102*a*, 102*b* of the upper support bar assemblies 100 into the upper support bar slots 64, 86 to reinforce the apparatus 10. Routing a length of drain tile 120 along the ground surface 130 extending between opposing ends of the apparatus 10. Inserting the drain vent 32 into one (1) end of the drain tile 120. Filling the apparatus 10 with a gravel portion of suitable soil fill 125 up to a height of approximately twenty-four (24) inches. Adding approximately twelve (12) inches of soil to the soil fill 125. Planting a desired number and arrangement of flowers, herbs, or vegetables into the soil fill 125. The apparatus 10 can be disassembled if desired, by reversing the above assembly steps and storing the members of the apparatus 10 until needed again.

The outwardly facing wall recessed portions 22 of each wall panel 20, 30 can be left in an as-manufactured state or alternatively can be decoratively covered in accordance with a user's preference using various materials such as, but not limited to: paint, ceramic or plastic tiles, bonded vinyl scenes, flagstone materials, and the like, to match an existing landscaping décor.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:

1. A modular interlocking planter comprising:
   a plurality of individual wall panels each having a front face, a rear face, a pair vertical sides, and a pair of horizontal sides, said pair of vertical sides each having a joint feature extending an entire height;
   a plurality of individual straight connectors each having a pair of straight connector slots along an entire height of two opposing side surfaces attachable to said joint feature; and,
   a plurality of individual outer corner connectors each having a pair of outer corner connector slots along an entire height of two adjacent side surfaces attachable to said joint feature;
   at least one inner corner connector having a pair of inner corner connector slots along an entire height of two adjacent side surfaces attachable to said joint feature;
   a plurality of upper support bar assemblies attachable between opposing pairs of straight connectors or between opposing inner corner connectors and straight connectors; and,
   a plurality of lower support bar assemblies attachable between opposing pairs of straight connectors or between opposing inner corner connectors and straight connectors;
   wherein said plurality of wall panels is selectively interconnected together on a ground surface to form an adjustable enclosure having a hollow interior and an open top, said enclosure adapted to receive and retain an amount of soil fill for cultivating vegetation;
   wherein each of said straight connectors connects first pairs of said plurality of wall panels in a planar orientation; and,
   wherein each of said outer corner connectors connects second pairs of said plurality of wall panels in a first perpendicular orientation;
   wherein each inner corner connector connects third pairs of said plurality of wall panels in a second perpendicular orientation;
   wherein each of said plurality of straight connectors further comprises a first support bar slot disposed on a side adjacent to said straight connector slots; and,
   each of said plurality of inner connectors further comprises a second support bar slot disposed on a side adjacent to said inner corner connector slots;
   wherein each of said plurality of upper support bar assemblies further comprises a pair of upper joining features connected together by an elongated upper support bar;
   wherein each of said plurality of lower support bar assemblies further comprises a pair of lower joining features connected together by an elongated lower support bar; and,
   wherein said lower joining features are slightly thinner than said upper joining features.

2. The apparatus of claim 1, wherein each of said straight connector slots, said outer corner connector slots, and said inner corner connector slots further comprise a generally T-shaped recess; and,
   said joint feature further comprises a generally T-shaped protrusion suitably sized to slide within any of said straight connectors slots, said outer corner connector slots, and said inner corner connector slots.

3. The apparatus of claim 1, wherein a single upper support bar assembly and a single lower support bar assembly are attachable to said support bar slots.

4. The apparatus of claim 1, wherein said upper joining features and said lower joining features are T-shaped.

5. The apparatus of claim 1, wherein said first support bar slot further comprises a T-shaped first upper support bar slot disposed on an upper portion and a T-shaped first lower support bar slot disposed on a lower portion; and,
   said second support bar slot further comprises a T-shaped second upper support bar slot disposed on an upper portion and a T-shaped second lower support bar slot disposed on a lower portion;
   wherein said lower support bar slots are slightly narrower that said upper support bar slots such that said lower joining features are slidable through an entirety of said lower support bar slots and said upper joining features are not slidable through said lower support bar slots.

6. The apparatus of claim 1, wherein at least one of said plurality of wall panels is a front wall panel further comprising a drain vent disposed through a lower end.

7. The apparatus of claim 6, further comprising a length of drain tile disposed within said enclosure hollow interior, wherein one end of said drain tile is connected in fluid communication with said drain vent.

8. The apparatus of claim 7, wherein each of said plurality of wall panels further comprises a wall recess portion disposed in said front face.

9. The apparatus of claim 8, wherein said wall recess portion is adapted to be covered by an attachable façade.

* * * * *